Feb. 25, 1958   H. STROHMEIER   2,824,951
WELDING PROCESS
Filed Nov. 12, 1954
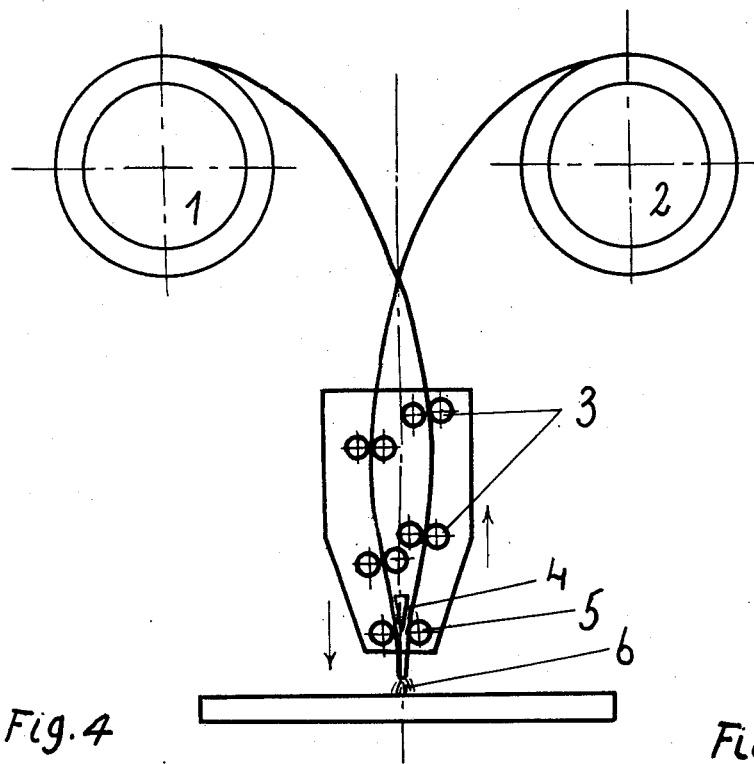
Fig 1
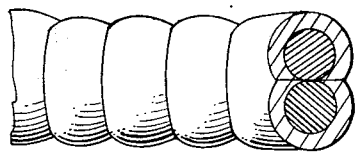
Fig. 4
Fig. 2
Fig 3
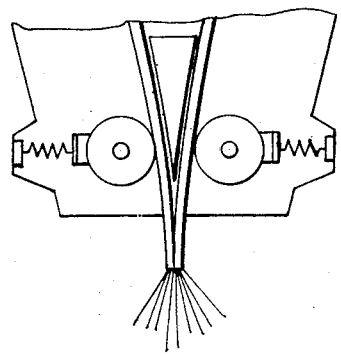
Fig. 5
Inventor
H. Strohmeier
Attys.

United States Patent Office 2,824,951
Patented Feb. 25, 1958

2,824,951

WELDING PROCESS

Harald Strohmeier, Kapfenberg, Steiermark, Austria, assignor to Gebr. Bohler & Co. Aktiengesellschaft, Vienna, Austria Application November 12, 1954, Serial No. 468,504

Claims priority, application Austria November 13, 1953

3 Claims. (Cl. 219—137)

In the process of automatic welding as hitherto known the welding-rod is moved continuously towards the welding-spot and the coating-material is not applied until the actual process of welding is started. Those processes, however, not only require complicated devices but also turned out to be of inadequate efficiency.

According to another method the welding seam gets covered with the powdered flux ahead of the actual welding-process, so that welding itself is carried out with the weld covered by flux-powder. This, however, excludes the possibility to observe, how the procedure is going on, so that it is not until the end of the process that the degree of success can be checked. In addition to this, processes as mentioned above only account for horizontal welds with the welding-seam provided on the upper surface of a specimen in approximately horizontal position; any deviation from this position would effect dropping of the powdered flux even before welding is started.

In another process which has become known, two welding-rods are used, each of them being provided with a coating applied in semi-circular shape around each cross-section; these two coated welding-rods are joined together to one single rod of round section inside the device immediately before reaching the welding-spot, whereas current is supplied by means of a sliding-contact on the bare surface of either one of these rods. There are two reasons, why practical application of this process did not become realized: at first the two wires diverged elastically at the welding spot, so that proper welding-seams could not be achieved; on the other hand the rod's cross-section not accounting for entire coating all around the circumference of each rod, the coating-material did not adhere to the two rods and was dropped as soon as the rods were bent together to be joined, i. e. before the welding-spot was reached.

A basic requirement for any device for automatic welding is, that it furnishes perfect welding-seams and that its efficiency is as high as possible without requiring too frequent checking of the course of the process.

High efficiencies however cannot be achieved, unless the cross-section of the welding-rod is large enough to allow for rapid deposit of the material in the welded joint. On the other hand, however, the welding-rod is supposed to penetrate right to the root of the wedge-shaped cross-section of the fillet-seam, for otherwise proper welding-seams cannot be achieved. In order to meet this latter requirement, however, the cross-section of the welding-rod is supposed to be as small as possible.

In order to realize both of the contradictory requirements mentioned above, namely deep penetration into the fillet-welding-seam as well as rapid loading of the welded joint with weld, attempts were made, to make and to apply welding-rods of oval cross-section. The manufacture of those rods, especially the process of coating as well as current-supply during the welding process however turned out to involve great difficulties. Another suggestion has been made, to perform welding with several coated welding-rods. This however requires a complicated system of current-supply to each of those rods.

In order to meet all requirements and to avoid all those disadvantages as well, this invention suggests to have two coated welding-rods of considerable lengths, which are continuously moved towards the welding-spot. Those rods are of round cross-section and practically coated, allowing but for bare surfaces along the lengths of each rod; by contact of these bare surfaces the two rods are joined together to form one single electrode of long cross-section, which is coated all around its circumference.

The subject of this invention is illustrated by a drawing, showing a practical example. Fig. 1 illustrates the basic principle of the welding-process as suggested by this invention. Figs. 2 and 3 are showing cross-sections of welding-electrodes with the welding-seams formed by them. Fig. 4 is a fragmental view partly in cross-section, showing the coating material of the electrodes provided with notches, and Fig. 5 is an enlarged detail view of the resilient mounting means for the pressing rolls.

The two wires are moved toward a wedge-shaped sliding-rail 4 from two wire-rings 1 and 2 by means of guiding-rolls and feeding-rolls 3. The two wires are contacted at their bare surfaces and pressed together by pressing-rolls 5 inside this sliding-rail, which also takes care of current-supply. The pressing-rolls are right above the welding-spot 6. Welding proceeds along the common longitudinal axis of the two rods, joined together to one single electrode; the advancing movement either can be performed by the welding-device itself or by the welding specimen.

The welding head can be turned by 90° in order to make possible continuous welding of wide welding-seams. If still wider welding-seams are desired the welding-head is suspended perpendicularly to the direction of the welding process, so that it can oscillate in perpendicular direction to the welding-seam.

In order to prevent the coating-material from getting detached while the welding-rod is moved towards the welding-spot, any curvature of the rod should be avoided. Therefore the sliding-rail is supposed to bend the rods slightly upwards while they get unrolled and to join them in a way, that owing to the tendency to resume their former state of curvature, the rods are pressing towards each other. This can be conveniently achieved by mounting each wire-ring on the side opposite the spot where respective rod is supposed to enter the sliding-rail. In order to prevent breaking of coating-material during bending while the rods are joined together, the coating-material can be furnished with notches arranged both in longitudinal direction in equal distances and perpendicular to this longitudinal direction in direction towards the bare surface. These notches preferably should be closed as perfectly as possible if the rod is in straight position, so that the latter is made to reach the welding-spot as a uniformly coated welding-electrode.

Fig. 2 shows the view of a welding-bead as it is formed during welding of longitudinal seams with a welding-rod as shown in cross-sectional view. The arrow indicates the direction of the welding-process.

Fig. 3 illustrates the welding-bead as well as a cross-section of the welding-electrode. If wide seams are desired the welding-rod is turned by 90° with respect to its position illustrated by Fig. 2, so that it performs welding with its larger side in the direction indicated by the arrow.

I claim:

1. A continuous method of welding which comprises forming two substantially identically shaped circular welding wires of substantial length and having each a conductive core and a coating having a cross-sectional shape of a ring lacking a segment the radial height of which is equal to the radial thickness of the coating, feeding said wires past a current supply zone contacting said cores where they are exposed due to the absence of said segment-shaped cross-sectional parts of the coatings, joining said cores at said exposed portions to form a single, elongated totally coated electrode immediately in advance of the point of welding, and feeding said electrode to the point of welding.

2. A method of welding which comprises feeding each of two substantially identically shaped welding wires of substantial length and having each a conductive core and a coating having a cross-sectional shape of a ring lacking a segment the radial height of which is equal to the radial thickness of the coating along a substantially arc-shaped path past current supply means contacting said core where it is exposed due to the absence of said segment-shaped cross-sectional part of the coating, subsequently bending said wires in a sense opposite to the curvature of said arc-shaped paths and joining said cores at said exposed portions to form a single, totally coated electrode, the cores being held together by the resiliency imparted to said wires due to their arc-shaped and reversely bent configuration, and feeding said electrode to a point of welding.

3. A method of welding which comprises feeding two substantially identically shaped welding wires of substantial length and having each a conductive core and a coating having a cross-sectional shape of a ring lacking a segment the radial height of which is equal to the radial thickness of the coating past current supply means contacting said cores where they are exposed due to the absence of said segment-shaped cross-sectional parts of the coatings, subsequently joining said cores at said exposed portions to form a single, totally coated electrode, and feeding said electrode to a point of welding, said coatings being formed with notches spaced in the longitudinal direction of the wires and extending at right angles to said longitudinal direction towards said exposed portion of the respective core.

References Cited in the file of this patent

UNITED STATES PATENTS

| | | |
|---|---|---|
| 1,643,254 | Miller | Sept. 20, 1927 |
| 2,083,309 | Applegate | June 8, 1937 |
| 2,149,490 | Allard | Mar. 7, 1939 |
| 2,469,790 | Schmerber | May 10, 1949 |
| 2,490,023 | Bernard | Dec. 6, 1949 |
| 2,562,132 | Senft | July 24, 1951 |

FOREIGN PATENTS

| | | |
|---|---|---|
| 609,848 | Germany | Feb. 26, 1935 |